Patented Oct. 19, 1948

2,451,655

UNITED STATES PATENT OFFICE 2,451,655

COATED WELDING ROD

Henri Bienfait and Paul Christiaan van der Willigen, Eindhoven, Netherlands, assignors, by mesne assignments, to Hartford National Bank and Trust Company, Hartford, Conn., as trustee No Drawing. Application January 28, 1946, Serial No. 643,971. In the Netherlands December 15, 1945

5 Claims. (Cl. 219—8)

This invention relates to coated welding rods which permit of electric arc-welding in such manner that when the work-piece is touched by the welding rod, the ignition of the arc may take place without any further expedients. We mean thereby that the welder has no need to perform a particular manipulation such as tapping, to initiate the welding process so that the welding rods may be considered to be of the self-starting type. With self-starting rods, a current is passed on touching the work-piece, which current has such a value that the starting of the arc occurs almost immediately thereafter, the melting-off process thus starting of its own accord.

The present invention is based on the recognition of the fact that with several coated welding rods of the kind wherein the coating mass has the property that preliminary melting or sintering raises the conductivity thereof for electric current to such an extent that an extremity of such a coated welding rod which has thus been treated beforehand is sufficient to make the rod self-starting. It is thus readily possible to select experimentally the welding rods that are suitable for use according to the invention. The presence of a fairly large quantity of semi-conductive material or of a metal, such as $Fe_3O_4$ or Fe, in the coating adds to the suitability for use of the invention, since the amount of such a material is in this case of influence.

According to the present invention, such coated welding rods are made self-starting by submitting the extremity intended for the formation of arc to a thermal treatment which locally brings about sintering or fusion of the coating mass.

As compared with entirely different methods of making the welding extremity of a coated welding rod to melt off automatically, such as by making it terminate in a metallic tip, or by providing a little conductive cap, the invention offers the advantage of a cheaper manufacture.

The present invention may be realised by heating the extremity of the rod for a short time to high temperature, for example with the aid of a hydrogen-oxygen flame, followed by cooling. The object of the present invention may also be attained by a formation of an arc of short duration. Furthermore, the heating of the welding extremity according to the invention may take place by the high-frequency method.

It is evident that the present invention has no reference to the ordinary manipulations of the welder, during which it occurs, even with welding rods adapted for use of the invention, that during the welding operation the arc is interrupted before the whole of the welding rod is consumed, since such a use of a welding rod has nothing to do with a method of manufacturing welding rods.

The invention is of particular importance for electric arc-welding by the touch-welding method, which is facilitated by it. In view thereof it is an obvious fact that the welding rods adapted for use of the invention also include welding rods which permit of touch-welding. In this case the coating must not only be suitable to give the welding rod the property of self-starting by means of melting or sintering at the extremity intended for the formation of the arc but the coating must also have a sufficient thickness and a softening point high enough to allow the welding rod to bear on the edge of the cup. A welding rod according to this particular form of construction lends itself to being used in an automatic device.

What we claim is:

1. In the manufacture of a self-starting welding rod for electric arc-welding, the method which comprises the steps of coating a metal core with semi-conductive slag-forming material having a constituent which is more conductive after fusing and heating the welding end of the coating to a high temperature for a short time to fuse said constituent and so convert the semi-conductive material at the said end portion into a conductive portion.

2. A method of providing a self-starting welding rod for electric arc-welding, which comprises the steps of coating a metal core with a semi-conductive coating having iron dispersed therein and heating an extremity of the rod for a short time to a high temperature to fuse the iron and so convert the semi-conductive coating at the said end portion into a conductive portion.

3. A coated electric arc-welding rod, comprising a semi-conductive slag-forming coating having a fusible metallic constituent dispersed therein, the portion of said coating at the welding extremity being in a fused form and so having a greater conductivity than the portion of the coating remote from said welding extremity.

4. A coated touch electric arc-welding rod, comprising a metal core and a semi-conductive coating having $Fe_3O_4$ dispersed therein, said coating being locally fused at the welding extremity to form a metallic tip and having a greater conductivity than the portion of the coating remote from said welding extremity.

5. A coated alternating current touch welding rod comprising a metal core and a semi-conductive coating having iron dispersed therein, said coating being locally fused at the welding extremity of the coating to form a metallic tip having a greater conductivity than the portion of the coating remote from said welding extremity.

HENRI BIENFAIT.
PAUL CHRISTIAAN van der WILLIGEN.

REFERENCES CITED

The following references are of record in the file of this patent:

UNITED STATES PATENTS

| Number | Name | Date |
|---|---|---|
| 2,370,100 | White | Feb. 20, 1945 |